United States Patent
Lee et al.

(10) Patent No.: US 11,990,615 B2
(45) Date of Patent: *May 21, 2024

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Sang Han Lee, Daejeon (KR); Min Gu Kang, Daejeon (KR); Jeong Bae Yoon, Daejeon (KR); Yong Hyun Cho, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,367

(22) Filed: Mar. 7, 2023

(65) Prior Publication Data

US 2023/0223527 A1 Jul. 13, 2023

Related U.S. Application Data

(63) Continuation of application No. 17/401,091, filed on Aug. 12, 2021, now Pat. No. 11,637,282.

(30) Foreign Application Priority Data

Aug. 13, 2020 (KR) .................. 10-2020-0101564
Nov. 12, 2020 (KR) .................. 10-2020-0150764

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 10,199,649 | B2 * | 2/2019 | Beck ..................... H01M 4/62 |
| 2020/0020944 | A1 * | 1/2020 | Park ..................... H01M 4/582 |
| 2020/0136132 | A1 * | 4/2020 | Hong ................. H01M 4/1391 |
| 2021/0036313 | A1 * | 2/2021 | Jeong ................... H01M 4/366 |
| 2021/0057723 | A1 * | 2/2021 | Gallant ................ H01M 4/133 |

FOREIGN PATENT DOCUMENTS

KR 20150003397 * 1/2015 .......... H01M 10/052

* cited by examiner

*Primary Examiner* — Jonathan Crepeau
*Assistant Examiner* — Angela J Martin
(74) *Attorney, Agent, or Firm* — IP & T GROUP LLP

(57) ABSTRACT

A cathode active material for a lithium secondary battery includes a lithium-transition metal composite oxide particle having a lattice strain ($\eta$) of 0.18 or less, which is calculated by applying Williamson-Hall method defined by Equation 1 to XRD peaks measured through XRD analysis, and having an XRD peak intensity ratio of 8.9% or less, which is defined by Equation 2. By controlling the lattice strain and XRD peak intensity ratio of the lithium-transition metal composite oxide particle, a lithium secondary battery with improved life-span characteristics as well as output characteristics is provided.

13 Claims, 3 Drawing Sheets

[FIG. 1]
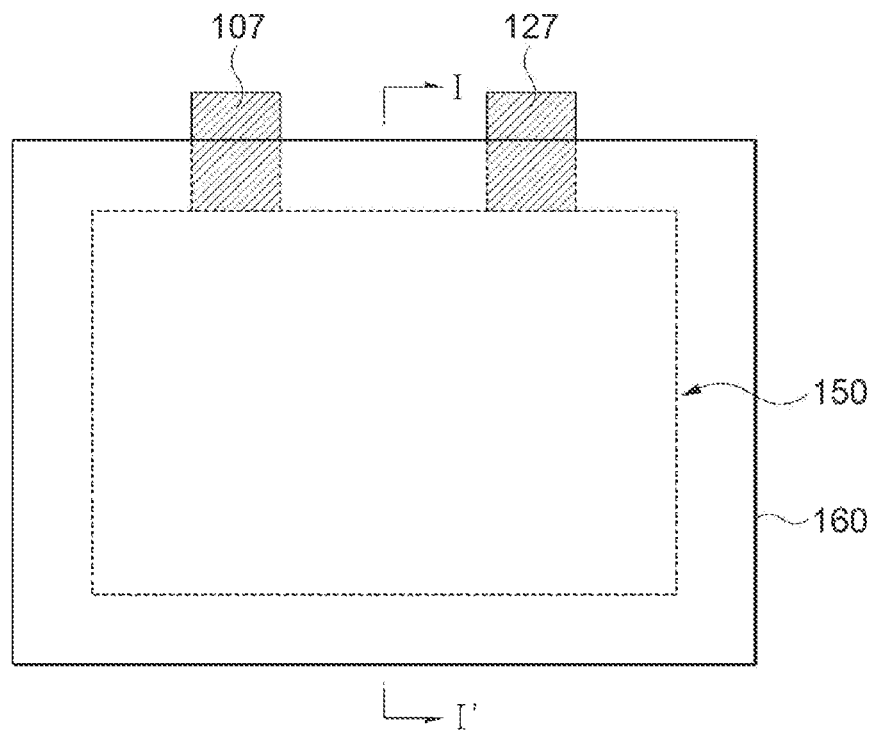
[FIG. 2]
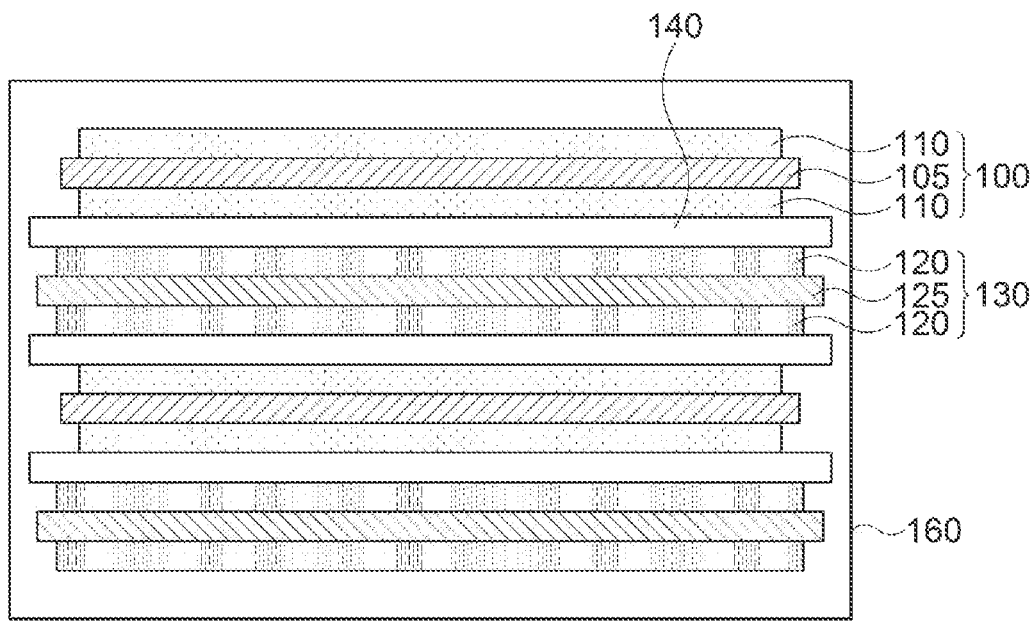

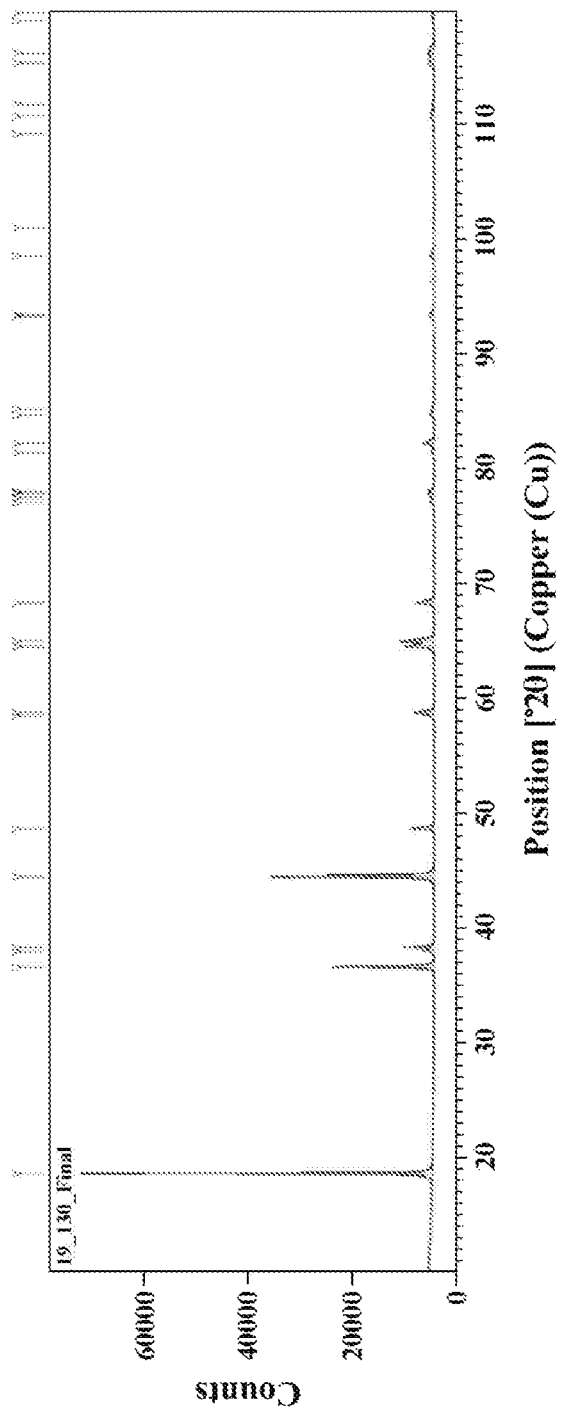
[FIG. 3]

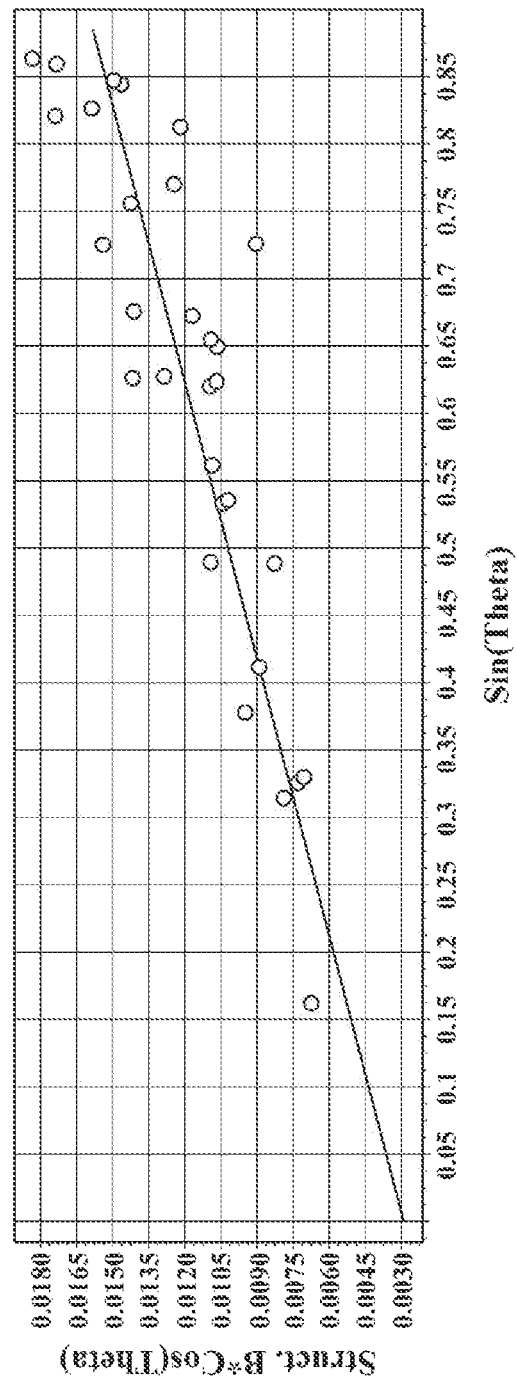
[FIG. 4]

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

The application is a continuation of U.S. patent application Ser. No. 17/401,091 filed on Aug. 12, 2021, which claims priority to Korean Patent Application No. 10-2020-0101564 filed on Aug. 13, 2020 and Korean Patent Application No. 10-2020-0150764 filed on Nov. 12, 2020 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a lithium secondary battery including the same, and more particularly, to a cathode active material for a lithium secondary battery including a lithium-transition metal composite oxide and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. However, if the lithium metal oxide is designed to have a high-power composition, thermal and mechanical stability of the lithium secondary battery may be degraded to also deteriorate life-span property and operational reliability.

For example, Korean Publication of Patent Application No. 10-2017-0093085 discloses a cathode active material including a transition metal compound and an ion adsorbing binder, which may not provide sufficient life-span and stability.

SUMMARY OF THE INVENTION

According to an aspect of the present invention, there is provided a cathode active material for a lithium secondary battery having improved operational stability and reliability.

According to an aspect of the present invention, there is provided a lithium secondary battery including a cathode active material with improved operational stability and reliability.

According to exemplary embodiments, a cathode active material for a lithium secondary battery includes a lithium-transition metal composite oxide particle. A lattice strain (η) calculated by applying Williamson-Hall method defined by Equation 1 to XRD peaks measured through X-ray diffraction (XRD) analysis is 0.18 or less, and an XRD peak intensity ratio defined by Equation 2 is 8.9% or less:

$$\beta \cos \theta = \eta \sin \theta + \lambda/D \qquad \text{[Equation 1]}$$

in Equation 1, $\beta$ represents full width at half maximum (FWHM) (rad) of the corresponding peak acquired through the XRD analysis, $\theta$ represents a diffraction angle (rad), $\eta$ represents a lattice strain (dimensionless number), $\lambda$ represents an X-ray wavelength (Å), and D represents a crystallite size (Å).

$$\text{XRD peak intensity ratio (\%)} = 100 \times I(110)/\{I(110)+I(003)\} \qquad \text{[Equation 2]}$$

in Equation 2, I(110) represents a maximum height of the peak of a (110) plane of the lithium-transition metal composite oxide particle by the XRD analysis, and I(003) represents a maximum height of the peak of a (003) plane of the lithium-transition metal composite oxide particle by the XRD analysis.

In some embodiments, the lattice strain of the lithium-transition metal composite oxide particle may be a slope of a straight line, and the straight line may be obtained by acquiring full widths at half maximum of all peaks appearing through the XRD analysis, and substituting the acquired full widths at half maximum in Equation 1 when plotting a horizontal axis with sine and a vertical axis with $\beta \cos \theta$.

In some embodiments, the XRD peak intensity ratio of the lithium-transition metal composite oxide particl is in a range from 4 to 8.9%.

In some embodiments, the lithium-transition metal composite oxide particle may have a polycrystalline structure in crystallography.

In some embodiments, the lithium-transition metal composite oxide particle may have at least one of a single particle, a primary particle, and a secondary particle in morphology.

In some embodiments, the lithium-transition metal composite oxide particle may have a composition represented by Chemical Formula 1 below:

$$Li_xNi_{1-y}M_yO_{2+z} \qquad \text{[Chemical Formula 1]}$$

(in Chemical Formula 1, x and y are in a range of 0.9≤x≤1.2, and 0≤y≤0.7, and z is in a range of −0.1≤z≤0.1, M is at least one element selected from the group consisting of Na, Mg, Ca, Y, Ti, Zr, Hf, V, Nb, Ta, Cr, Mo, N, Mn, Co, Fe, Cu, Ag, Zn, B, Al, Ga, C, Si, Sn and Zr).

In some embodiments, in Chemical Formula 1, (1−y) may be 0.8 or more.

In some embodiments, in Chemical Formula 1, M may include Co and Mn.

In some embodiments, the lithium-transition metal composite oxide particles may be manufactured by reacting a transition metal precursor with a lithium precursor.

In some embodiments, the transition metal precursor may be a Ni—Co—Mn precursor.

In some embodiments, the lithium precursor may include lithium carbonate, lithium nitrate, lithium acetate, lithium oxide or lithium hydroxide.

According to another aspect of the present invention, a lithium secondary battery includes a cathode which includes a cathode active material layer including the cathode active material according to the above-described embodiments; an anode facing the cathode.

The lithium secondary battery according to the above-described exemplary embodiments may include the lithium-transition metal composite oxide particle having a lattice strain of 0.18 or less and satisfying an XRD peak intensity ratio of a predetermined value or less as a cathode active material. Thus, particle strength may be increased, and output characteristics may be improved.

By controlling the lattice strain to 0.18 or less, so that a phenomenon in which particles are cracked in boundary regions between crystal grains or between particles may be prevented. Accordingly, gas generation in a high-temperature environment and/or gas generation during charging and discharging may be prevented, thus the life-span characteristics of the secondary battery may be improved.

In addition, a lithium diffusion distance may be shortened by controlling the XRD peak intensity ratio to a predetermined value or less, thus output characteristics of the battery may be improved. In this case, a decrease in relative life-span characteristics due to the shortening of the lithium diffusion distance may be relieved or compensated by controlling the lattice strain to 0.18 or less.

Thus, the lithium-transition metal composite oxide particle satisfying the above-described lattice strain and XRD peak intensity ratio have the above-described particle strength and output performance, and thus operational stability, life-span characteristics, and output characteristics may be improved together.

BRIEF DESCRIPTION OF THE DRAWINGS

FIGS. 1 and 2 are a schematic planar view and a cross-sectional view illustrating a lithium secondary battery according to exemplary embodiments, respectively; and FIGS. 3 and 4 are exemplary graphs illustrating a method of applying Williamson-Hall method to a numerical value acquired through X-ray diffraction (XRD) analysis in an exemplary embodiment.

DETAILED DESCRIPTION OF THE INVENTION

Embodiments of the present invention provide a lithium secondary battery including a lithium-transition metal composite oxide particle having a lattice strain value and an XRD peak intensity ratio in a predetermined range, respectively, as a cathode active material.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

FIGS. 1 and 2 are a schematic top planar view and a schematic cross-sectional view, respectively, illustrating a lithium secondary battery in accordance with exemplary embodiments. Hereinafter, a cathode active material for a lithium secondary battery and a lithium secondary battery including the same will be described with reference to FIGS. 1 and 2.

Referring to FIGS. 1 and 2, a lithium secondary battery may include an electrode assembly that may include a cathode 100, an anode 130 and a separation layer 140 interposed between the cathode 100 and the anode 130. The electrode assembly may be inserted in a case 160 together with an electrolyte to be immersed therein.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include lithium-transition metal composite oxide particles.

For example, the lithium-transition metal composite oxide particle may include nickel (Ni), and may further include at least one of cobalt (Co) and manganese (Mn).

For example, the lithium-transition metal composite oxide particle may be represented by Chemical Formula 1 below.

$$Li_xNi_{1-y}M_yO_{2+z}$$ [Chemical Formula 1]

In Chemical Formula 1, x and y may be in a range of $0.9 \leq x \leq 1.2$, and $0 \leq y \leq 0.7$, and z may be in a range of $-0.1 \leq z \leq 0.1$. M may be at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some embodiments, a molar ratio or concentration (1−y) of Ni in Chemical Formula 1 may be 0.8 or more, and exceeds 0.8 in a preferred embodiment.

Ni may serve as a transition metal related to power and capacity of a lithium secondary battery. Thus, as described above, a high-Ni composition may be applied to the lithium-transition metal composite oxide particle so that high-power cathode and lithium secondary battery may be provided.

However, as a content of Ni increases, long-term storage stability and life-span stability of the cathode or the secondary battery may be relatively deteriorated. However, according to exemplary embodiments, life stability and capacity retention properties may be improved by employing Mn while maintaining electrical conductivity by including Co.

In some embodiments, the cathode active material or the lithium-transition metal composite oxide particle may further include a coating element or a doping element. For example, the coating element or the doping element may include Al, Ti, Ba, Zr, Si, B, Mg, P, an alloy thereof or an oxide thereof. These may be used alone or in combination thereof. The cathode active material particles may be passivated by the coating or doping element, stability and life-span properties against a penetration of an external object may be further improved.

For example, a nickel-manganese-cobalt precursor (e.g., nickel-cobalt-manganese hydroxide) and a lithium precursor (e.g., lithium hydroxide or lithium carbonate) may be reacted by a wet mixing or a dry mixing, and then a reacted product may be fired to prepare the lithium-transition metal composite oxide particle.

The lithium-transition metal composite oxide particles may have a single crystal and/or polycrystalline structure in a crystallographic aspect. In an embodiment, the cathode active material may include a mixture or a blend of single crystal particles and polycrystalline particles.

In some embodiments, the lithium-transition metal composite oxide particle may have a polycrystalline structure in crystallography. In this case, lattice strain described below may occur in a boundary region between crystal grains, and thus, a cracking phenomenon in the boundary region may occur.

According to exemplary embodiments of the present invention, cracking in the boundary region are decreased, so that gas generation by repeated charging and discharging and in a high-temperature environment may be reduced, and life-span characteristics of the secondary battery may be further improved.

The lithium-transition metal composite oxide particle may have a form of a single particle, primary particle or secondary particle in morphology.

FIGS. 3 and 4 are exemplary graphs illustrating a method of applying Williamson-Hall method to a numerical value acquired through an X-ray diffraction (XRD) analysis in an exemplary embodiment.

Referring to FIG. 3, XRD peaks may be acquired by the XRD analysis, and a lattice strain of the lithium-transition metal composite oxide particle may be obtained by applying Williamson-Hall method defined by Equation 1 below to the acquired peaks.

$$\beta \cos \theta = \eta \sin \theta + \lambda/D \qquad \text{[Equation 1]}$$

In Equation 1, $\beta$ represents full width at half maximum (FWHM) (rad) of the corresponding peak acquired through the XRD analysis, $\theta$ represents a diffraction angle (rad), $\eta$ represents a lattice strain (dimensionless number), $\lambda$ represents an X-ray wavelength (Å), and D represents a crystallite size (Å).

In some embodiments, in the Equation 1 above, S may be a half-width correcting a value derived from a device. In an embodiment, Si may be used as a standard material for reflecting the device-derived value. In this case, a half-width profile of Si over an entire 2θ range may be fitted, and the device-derived half-width may be expressed as a function of 2θ.

Thereafter, a value obtained by subtracting and correcting the half width value derived from the device in the corresponding 2θ obtained from the above function may be used as S.

For example, the XRD analysis may be performed by using Cu-Kα rays as a light source for the dried powder of the lithium-transition metal composite oxide particle in a diffraction angle (2θ) range of 10° to 120° at a scan rate of 0.0065°/step.

Referring to FIG. 4, after measuring the full widths at half maximum of all peaks appearing in the diffraction angle range, a slope may be acquired through linear regression analysis to calculate the lattice strain by substituting the acquired measurement values in Equation 1 (Williamson-Hall method).

For example, the lattice strain may be defined as a slope of a straight line which is obtained when plotting a horizontal axis with sin θ and a vertical axis with β cos θ in Equation 1 above.

In exemplary embodiments, the lattice strain may be 0.18 or less. When the lattice strain is 0.18 or less, the lattice strain in the boundary region between crystal grains or between the particles of the lithium-transition metal composite oxide particle may be decreased.

When the lattice strain exceeds 0.18, the lattice strain of the lithium-transition metal composite oxide particle may be increased, and thus life-span characteristics such as gas generation and capacity retention rate at a high temperature may be deteriorated.

Accordingly, a cracking phenomenon of the particles mainly occurred in the boundary region between crystal grains during a press process for forming the cathode active material layer 110 or when charging and discharging the battery may be reduced. Thus, the particle strength of the lithium-transition metal composite oxide particle may be increased, and a high-density electrode may be implemented. In this case, for example, an amount of gas generated at a high temperature may be reduced, and gas generation due to repeated charging/discharging may be suppressed. Thus, stable capacity characteristics even in a high temperature environment may be provided and the life-span characteristics of the lithium secondary battery may be improved.

In some embodiments, the lattice strain may be in a range of 0.03 to 0.18. When the lattice strain is 0.03 or more, a strength of the lithium-transition metal composite oxide is excessively increased, thus impregnation property of the battery may be prevented from being reduced. Thus, a deterioration in the output characteristics of the battery may be prevented and the life-span characteristics may be improved.

According to exemplary embodiments, the lithium-transition metal composite oxide particles may have an XRD peak intensity ratio defined by Equation 2 below of 8.9% or less.

$$\text{XRD peak intensity ratio (\%)} = 100 \times I(110)/\{I(110)+I(003)\} \qquad \text{[Equation 2]}$$

In Equation 2, I(110) represents a peak intensity or a maximum height of a (110) plane by X-ray diffraction (XRD) analysis of the lithium-transition metal composite oxide particle, and I(003) represents a peak intensity or a maximum height of a (003) plane by the XRD analysis of the lithium-transition metal composite oxide particle.

For example, the XRD analysis may be performed using a Cu Kα ray as a light source for a dried powder of the lithium-transition metal composite oxide particles, in a range of diffraction angle (2θ) of 10o to 120o at a scan rate of 0.0065o/step.

In the above-described XRD peak intensity ratio range, an ion propagation length and an ion diffusion length on the (110) plane through which lithium ions are diffused may be reduced. Additionally, the ratio of the peak intensity relative to the (003) plane that intersects the (110) plane may be adjusted to reflect an aspect ratio of the particles. Accordingly, a decrease in the output due to an increase in the lithium diffusion length or an excessive increase in the aspect ratio of the particle may be prevented.

For example, a capacity degradation phenomenon caused by repeatedly charging/discharging of the lithium secondary battery propagates from the (110) plane to an inside of the particles, thus the battery degradation rate may be increased and the life-span characteristics of the battery may be relatively reduced when the diffusion length of lithium ions is reduced.

However, according to exemplary embodiments, the lithium-transition metal composite oxide having a lattice strain of 0.18 or less is employed to increase the particle strength, so that a decrease in life-span characteristics at a relatively high temperature due to controlling the XRD peak intensity ratio to 8.93 or less may be relieved or compensated.

Therefore, a high-density electrode may be implemented by reducing particle cracks through the control of the lattice strain, a gas generation to increase life-span stability in a high-temperature environment may be prevented, and output/capacity may be enhanced by increasing lithium ion migration characteristics through the control of the XRD peak intensity ratio together.

In one embodiment, the XRD peak intensity ratio may be 4 to 8.9, and preferably 5 to 8.9. Within the above range, it is possible to enhance the output characteristics while maintaining the surface stability and life-span characteristics of the lithium-transition metal composite oxide particle.

For example, a transition metal precursor (e.g., a Ni—Co—Mn precursor) for preparing the lithium-transition metal composite oxide particle may be prepared through a co-precipitation reaction.

The above-described transition metal precursor may be prepared through a co-precipitation reaction of metal salts. The metal salts may include a nickel salt, manganese salt and a cobalt salt.

Examples of the nickel salt may include nickel sulfate, nickel hydroxide, nickel nitrate, nickel acetate, hydrates thereof, etc. Examples of the manganese salt may include manganese sulfate, manganese acetate, hydrates thereof, etc. Examples of the cobalt salt may include cobalt sulfate, cobalt nitrate, cobalt carbonate, hydrates thereof, etc.

The metal salts may be mixed with a precipitating agent and/or a chelating agent in a ratio that may satisfy a content or a concentration ratio of each metal described with reference to Chemical Formula 1 to prepare an aqueous solution. The aqueous solution may be co-precipitated in a reactor to prepare the transition metal precursor.

The precipitating agent may include an alkaline compound such as sodium hydroxide (NaOH), sodium carbonate (Na2CO3), etc. The chelating agent may include, e.g., aqueous ammonia (e.g., NH3H2O), ammonium carbonate (e.g., NH3HCO3), or the like.

For example, a temperature of the co-precipitation reaction may be adjusted in a range from about 40° C. to 60° C. A reaction time may be adjusted in a range from about 24 to 72 hours.

For example, the lithium-transition metal composite oxide particle may be prepared by reacting the transition metal precursor and a lithium precursor with each other. The lithium precursor compound may include, e.g., lithium carbonate, lithium nitrate, lithium acetate, lithium oxide, lithium hydroxide, or the like. These may be used alone or in combination thereof.

Thereafter, for example, lithium impurities or unreacted precursors may be removed through a washing process, and metal particles may be fixed or crystallinity may be increased through a heat treatment (firing) process. In an embodiment, a temperature of the heat treatment may be in a range from about 600° C. to 1000° C.

For example, the heat treatment process may include a first calcination treatment performed at a high temperature and a second calcination treatment performed at a relatively lower temperature than the high temperature. Specifically, after the first calcination treatment is performed, the second calcination treatment may be performed at a temperature lower than the temperature at which the first calcination treatment is performed. In this case, the strength and hardness of the formed lithium-transition metal composite oxide particles may be improved, such that the life-span characteristics and driving stability of the secondary battery may be enhanced.

For example, the first calcination treatment may be performed at 800 to 1,000° C., and the second calcination treatment may be performed at 600 to 950° C.

For example, the above-described XRD peak ratio may be changed according to the above-described co-precipitation reaction time, the reaction temperature, heat treatment temperature, or the like.

The cathode active material particle including the above-mentioned lithium-transition metal composite oxide particle may be mixed and stirred together with a binder, a conductive agent and/or a dispersive agent in a solvent to form a slurry. The slurry may be coated on the cathode current collector 105, and dried and pressed to obtain the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the secondary battery may be further improved.

The conductive agent may be added to facilitate an electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as LaSrCoO3 or LaSrMnO3.

In exemplary embodiments, the anode 130 may include an anode current collector 125 and an anode active material layer 120 formed by coating an anode active material on the anode current collector 125.

The anode active material may include a material that may be capable of adsorbing and ejecting lithium ions. For example, a carbon-based material such as a crystalline carbon, an amorphous carbon, a carbon complex or a carbon fiber, a lithium alloy, a silicon-based compound, tin, etc., may be used. The amorphous carbon may include a hard carbon, cokes, a mesocarbon microbead (MCMB), a mesophase pitch-based carbon fiber (MPCF), etc.

The crystalline carbon may include a graphite-based material, such as natural graphite, artificial graphite, graphitized cokes, graphitized MCMB, graphitized MPCF, etc. The lithium alloy may further include aluminum, zinc, bismuth, cadmium, antimony, silicon, lead, tin, gallium, or indium.

The silicon-based compound may include, e.g., silicon oxide or a silicon-carbon composite compound such as silicon carbide (SiC).

For example, the anode active material may be mixed and stirred together with a binder, a conductive agent and/or a dispersive agent in a solvent to form a slurry. The slurry may be coated on at least one surface of the anode current collector 125, and dried and pressed to obtain the anode 130.

The binder and the conductive agent substantially the same as or similar to those used in the cathode active material layer 110 may be used. In some embodiments, the binder for the anode may include an aqueous binder such as such as styrene-butadiene rubber (SBR) that may be used with a thickener such as carboxymethyl cellulose (CMC) so that compatibility with the carbon-based active material may be improved.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also be formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation.

In exemplary embodiments, an electrode cell may be defined by the cathode 100, the anode 130 and the separation layer 140, and a plurality of the electrode cells may be stacked to form an electrode assembly having, e.g., a jelly roll shape. For example, the electrode assembly 150 may be formed by winding, laminating or folding of the separation layer 140.

The electrode assembly 150 may be accommodated in a case 160 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by Li+X, and an anion of the lithium salt X may include, e.g., F—, Cl—, Br—, I—, NO3-, N(CN)2-, BF4-, C104-, PF6-, (CF3) 2PF4-, (CF3) 3PF3-, (CF3) 4PF2-, (CF3) 5PF—, (CF3) 6P—, CF3SO3-, CF3CF2SO3-, (CF3SO2)2N—, (FSO2)2N—, CF3CF2(CF3)2CO—, (CF3SO2)2CH—, (SF5)3C—, (CF3SO2)3C—, CF3(CF2)7SO3-, CF3CO2-, CH3CO2-, SCN—, (CF3CF2SO2)2N—, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode current collector path 125 of each electrode cell to extend to a side of the case 160. The electrode tabs may be fused together with the side of the case 160 to form an electrode lead (a cathode lead 107 and an anode lead 127) extending or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparation of the Lithium-Transition Metal Composite Oxide Particle $NiSO_4$, $CoSO_4$ and $MnSO_4$ were mixed in a ratio of 0.8:0.1:0.1, respectively, using distilled water with internal dissolved oxygen removed by bubbling with $N_2$ for 24 hours. The solution was introduced into a reactor at 55° C., and a co-precipitation reaction was performed for 36 hours using NaOH and $NH_3H_2O$ as a precipitant and a chelating agent to obtain $Ni_{0.8}Co_{0.1}Mn_{0.1}(OH)_2$ as a transition metal precursor. The obtained precursor was dried at 80° C. for 12 hours and then again dried at 110° C. for 12 hours.

Then, lithium hydroxide and the transition metal precursor were added in a ratio of 1.05:1 in a dry high-speed mixer, followed by uniformly stirring and mixing the same for 5 minutes. The mixture was put in a calcination furnace, heated to 950° C. at a heating rate of 2° C./min, maintained at 950° C. for 5 hours, and then naturally cooled to 900° C. and maintained for 5 hours. Oxygen was passed through continuously at a flow rate of 10 mL/min during heating and maintenance. After completion of the calcination, the mixture was naturally cooled to room temperature, followed by pulverizing and distributing to manufacture the lithium-transition metal composite oxide particle (Particle 1) in a form of a single particle (including single crystal and polycrystalline structures) as a cathode active material represented by $LiNi_{0.8}Co_{0.1}Mn_{0.1}O_2$.

A reaction time or a reaction temperature in the reactor, or a firing time or a firing temperature in the firing process were changed to further prepare particles 2 to 9. Through XRD analysis conducted on each of the lithium-transition metal composite oxide particles, the lattice strain calculated using Equation 1 and the XRD peak intensity ratio calculated using Equation 2 were produced and shown in Table 2 below.

Detailed XRD analysis equipment/conditions are shown in Table 1 below.

TABLE 1

| XRD (X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10-120° |
| Scan Step Size | 0.0065° |
| Divergence slit | ¼° |
| Antiscatter slit | ½° |

TABLE 2

| | Classification | Lattice strain | XRD peak intensity ratio [100 × I(110)/ {I(110) + I(003)}] |
|---|---|---|---|
| Lithium-transition metal composite oxide particle | Particle 1 | 0.15 | 6.89 |
| | Particle 2 | 0.14 | 7.42 |
| | Particle 3 | 0.15 | 3.9 |
| | Particle 4 | 0.19 | 9.83 |
| | Particle 5 | 0.21 | 9.8 |
| | Particle 6 | 0.2 | 9.8 |
| | Particle 7 | 0.11 | 8.974 |
| | Particle 8 | 0.22 | 7.856 |
| | Particle 9 | 0.19 | 8.6 |

Example 1

A secondary battery was manufactured using the above-described particle 1 as a cathode active material. Specifically, the cathode active material particle, Denka Black as a conductive additive and PVDF as a binder were mixed by a weight ratio of 97:2:1 to form a cathode slurry. The cathode slurry was coated, dried, and pressed on an aluminum substrate to form a cathode. A density of the cathode after the pressing was controlled as 3.71 g/cc An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

The cathode and the anode obtained as described above were notched by a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M LiPF6 in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

The lithium secondary battery as fabricated above was pre-charged by applying a pre-charging current (5 A) corresponding to 0.25 C for 36 minutes. After 1 hour, the battery was degased, aged for more than 24 hours, and then a formation charging-discharging (charging condition of CC—CV 0.2 C 4.2 V 0.05 C CUT-OFF, discharging condition of CC 0.2 C 2.5 V CUT-OFF) was performed.

Example 2

A secondary battery was manufactured according to the same procedures as described in Example 1, except that the target electrode density of the cathode was controlled to 3.85 g/cc.

Example 3

A secondary battery was manufactured according to the same procedures as described in Example 1, except that the above-describe particle 2 were used as a cathode active material.

Example 4

A secondary battery was manufactured according to the same procedures as described in Example 3, except that the target electrode density of the cathode was controlled to 3.85 g/cc.

Example 5

A secondary battery was manufactured according to the same procedures as described in Example 1, except that the above-described particle 3 were used as a cathode active material.

Comparative Example 1

A secondary battery was manufactured according to the same procedures as described in Example 1, except that the above-described particle 4 were used as a cathode active material.

Comparative Example 2

A secondary battery was manufactured according to the same procedures as described in Comparative Example 1, except that the target electrode density of the cathode was controlled to 3.85 g/cc.

Comparative Example 3

A secondary battery was manufactured according to the same procedures as described in Example 1, except that the above-described particle 5 were used as a cathode active material.

Comparative Example 4

A secondary battery was manufactured according to the same procedures as described in Example 1, except that the above-described particle 6 were used as a cathode active material.

Comparative Example 5

A secondary battery was manufactured according to the same procedures as described in Example 1, except that the above-described particle 7 were used as a cathode active material.

Comparative Example 6

A secondary battery was manufactured according to the same procedures as described in Example 1, except that the above-described particle 8 were used as a cathode active material.

Comparative Example 7

A secondary battery was manufactured according to the same procedures as described in Example 1, except that the above-described particle 9 were used as a cathode active material.

Component particles, lattice strains, XD peak intensity ratios, and electrode densities of the above-described examples and comparative examples are shown in Table 3 below.

TABLE 3

| Classification | Lithium-transition metal composite oxide particle | Target electrode density (g/cc) | Lattice strain | XRD peak intensity ratio [100 × I(110)/ {I(110) + I(003)}] |
|---|---|---|---|---|
| Example 1 | Particle 1 | 3.71 | 0.15 | 6.89 |
| Example 2 | | 3.85 | | |
| Example 3 | Particle 2 | 3.71 | 0.14 | 7.42 |
| Example 4 | | 3.85 | | |
| Example 5 | Particle 3 | 3.71 | 0.15 | 3.9 |
| Comparative Example 1 | Particle 4 | 3.71 | 0.19 | 9.83 |
| Comparative Example 2 | | 3.85 | | |
| Comparative Example 3 | Particle 5 | 3.71 | 0.21 | 9.8 |
| Comparative Example 4 | Particle 6 | 3.71 | 0.2 | 9.8 |

TABLE 3-continued

| Classification | Lithium-transition metal composite oxide particle | Target electrode density (g/cc) | Lattice strain | XRD peak intensity ratio [100 × I(110)/{I(110) + I(003)}] |
|---|---|---|---|---|
| Comparative Example 5 | Particle 7 | 3.71 | 0.11 | 8.974 |
| Comparative Example 6 | Particle 8 | 3.71 | 0.22 | 7.856 |
| Comparative Example 7 | Particle 9 | 3.71 | 0.19 | 8.6 |

Experimental Example (1) Measurement (Actual Measurement) of Electrode Density

The cathodes of the above-described lithium secondary batteries of the examples and comparative examples were coated on both sides and punched to a size of 12 pi (diameter: 12 mm), and then electrode densities were measured through the following equation.

Electrode density(g/cc)=(Weight of double-sided coated electrode−Weight of foil)/{(Total thickness of double-sided coated electrode−Thickness of foil)×12$pi$ area}

(2) Measurement of Hot Gas Generation

After charging (1C 4.2 V 0.1C CUT-OFF) the above-described lithium secondary batteries of the examples and comparative examples, the amount of gas generated after 1 week and after 4 weeks of storage in a 60° C. constant temperature chamber was measured using a gas chromatography (GC) analysis. To measure a total amount of the generated gas, a hole was formed through the vacuum chamber having a predetermined volume (V) and a pressure change was measured to calculate a volume of the generated gas.

(3) Measurement of Amount of Gas Generated after Repeatedly Charging and Discharging Charging (CC—CV 1.0 C 4.2V 0.05C CUT-OFF) and discharging (CC 1.0C 2.7V CUT-OFF) of the lithium secondary batteries of Examples and Comparative Examples were repeated 100 times and 300 times in a chamber at 45° C., and then the amount of gas was measured by the same method as that in the above (1).

(4) Measurement of Life-Span (Capacity Retention Rate) at 45° C.

After charging (1C 4.2 V 0.1C CUT-OFF) the above-described lithium secondary batteries of the examples and comparative examples, and storing them in a thermostatic chamber at 45° C., capacity retention rates after 4 weeks were calculated by calculating discharge capacity after 4 weeks as a percentage (%) compared to the initial discharge capacity.

After repeatedly charging (CC—CV 1.0C 4.2 V 0.05C CUT-OFF) and discharging (CC 1.0C 2.7 V CUT-OFF) the above-described lithium secondary batteries of the examples and the comparative examples 300 times in a chamber at 45° C., capacity retention rates after 300 cycles were evaluated by calculating the discharge capacity at 300 times as a percentage (F) compared to the discharge capacity at one time.

The evaluation results are shown in Table 4 below.

TABLE 4

| Classification | Electrode density (g/cc) | | Gas generation at a high temperature (mL) | | Gas generation after repeated charging/discharging (mL) | | Capacity retention rate (%) | |
|---|---|---|---|---|---|---|---|---|
| | Target | Actual measurement | After 1 week | After 4 weeks | After 100 cycles | After 300 cycles | After 4 weeks | After 300 cycles |
| Example 1 | 3.71 | 3.75 | 7.69 | 12.97 | 6.72 | 10.35 | 96.9 | 95 |
| Example 2 | 3.85 | 3.88 | 8.09 | 16.13 | 6.84 | 11.25 | 95.9 | 94 |
| Example 3 | 3.71 | 3.71 | 6.90 | 11.04 | 6.91 | 10.92 | 96.5 | 95 |
| Example 4 | 3.85 | 3.85 | 7.92 | 17.23 | 7.04 | 11.88 | 95.8 | 95 |
| Example 5 | 3.71 | 3.68 | 7.68 | 15.01 | 10.11 | 19.51 | 96.9 | 90 |
| Conparative Example 1 | 3.71 | 3.66 | 24.9 | 32.04 | 20.2 | 24.34 | 96.9 | 83 |
| Conparative Example 2 | 3.85 | 3.73 | 15.56 | 19.61 | 17.08 | 26.27 | 96.9 | 82 |
| Conparative Example 3 | 3.71 | 3.65 | 48.44 | 67.03 | 36.6 | 30.38 | 90.6 | 80 |
| Conparative Example 4 | 3.71 | 3.63 | 48.74 | 65.31 | 36.3 | 32.31 | 91.3 | 81 |
| Conparative Example 5 | 3.71 | 3.72 | 22.35 | 30.64 | 18.6 | 22.1 | 95.3 | 87 |
| Conparative Example 6 | 3.71 | 3.68 | 24.87 | 37.56 | 26.29 | 33.17 | 94.9 | 84 |
| Conparative Example 7 | 3.71 | 3.6 | 23.2 | 28.1 | 19.5 | 23.3 | 96.9 | 83 |

Referring to Table 4, in the case of the lithium secondary batteries of the examples, which use the lithium-transition metal composite oxide particle having a lattice strain of 0.18 or less and satisfying an XRD peak intensity ratio of 8.9% or less, good capacity retention rates were ensured with higher electrode densities while having suppressed amount of gas generated as a whole than the lithium secondary batteries of the comparative examples.

Specifically, the lithium secondary batteries of Examples 1 to 3 having a lattice strain of 0.03 to 0.18 and an XRD peak intensity ratio of 4 to 8.9% exhibited significantly reduced amount of gas generated at a high temperature and during repeated charging/discharging and excellent capacity retention rate compared to the lithium secondary batteries of the comparative examples.

However, the lithium secondary battery of Example 5 having an XRD peak intensity ratio of less than 4%, secured a small amount of gas generated and an excellent capacity retention rate compared to the lithium secondary batteries of the comparative examples, but exhibited a somewhat higher amount of gas generated and a lower capacity retention rate than the lithium secondary batteries of Examples 1 to 3.

Comparative Example 5 is a comparative example relating to a lithium secondary battery having a lattice strain of 0.18 or less, and an XRD peak intensity ratio exceeding 8.9%, and Comparative Examples 6 and 7 are comparative examples relating to lithium secondary batteries having an XRD peak intensity ratio of 8.9% or less, and a lattice strain of exceeding 0.18. Similar to Comparative Examples 1 to 4, the lithium secondary batteries of Comparative Examples 5 to 7 had a large amount of gas generated and reduced capacity retention rate as a whole compared to the lithium secondary batteries of the examples.

DESCRIPTION OF REFERENCE NUMERALS

100: Cathode
105: Cathode current collector
107: Cathode lead
110: Cathode active material layer
120: Anode active material layer
125: Anode current collector
127: Anode lead
130: Anode
140: Separation membrane
150: Electrode assembly
160: Case

What is claimed is:

1. A cathode active material for a lithium secondary battery comprising a lithium-transition metal composite oxide particle,
   wherein the lithium-transition metal composite oxide particle contains nickel,
   wherein a lattice strain ($\eta$) calculated by applying Williamson-Hall method defined by Equation 1 to XRD peaks measured through X-ray diffraction (XRD) analysis is 0.18 or less, $$\beta \cos \theta = \eta \sin \theta + \lambda/D \quad \text{[Equation 1]}$$

wherein, in Equation 1, $\beta$ represents full width at half maximum (FWHM) (rad) of one of the peaks, $\theta$ represents a diffraction angle (rad) of the one of the peaks, $\eta$ represents a lattice strain (dimensionless number), $\lambda$ represents an X-ray wavelength (Å), and D represents a crystallite size (Å).

2. The cathode active material for a lithium secondary battery according to claim 1, wherein the lattice strain of the lithium-transition metal composite oxide particle is a slope of a straight line, and
   the straight line is obtained by acquiring full widths at half maximum of all peaks appearing through the XRD analysis, and substituting the acquired full widths at half maximum in Equation 1 when plotting a horizontal axis with sin $\theta$ and a vertical axis with $\beta \cos \theta$.

3. The cathode active material for a lithium secondary battery according to claim 1, wherein an XRD peak intensity ratio defined by Equation 2 is 8.9% or less:

XRD peak intensity ratio (%)=100×$I$(110)/{$I$(110)+$I$(003)}     [Equation 2]

wherein, in Equation 2, I(110) represents a maximum height of the peak of a (110) plane of the lithium-transition metal composite oxide particle by the XRD analysis, and I(003) represents a maximum height of the peak of a (003) plane of the lithium-transition metal composite oxide particle by the XRD analysis.

4. The cathode active material for a lithium secondary battery according to claim 3, wherein the XRD peak intensity ratio of the lithium-transition metal composite oxide particle is in a range from 4 to 8.9%.

5. The cathode active material for a lithium secondary battery according to claim 1, wherein the lithium-transition metal composite oxide particle has a polycrystalline structure in crystallography.

6. The cathode active material for a lithium secondary battery according to claim 1, wherein the lithium-transition metal composite oxide particle has at least one of a single particle, a primary particle, and a secondary particle in morphology.

7. The cathode active material for a lithium secondary battery according to claim 1, wherein the lithium-transition metal composite oxide particle has a composition represented by Chemical Formula 1 below:

   $$Li_xNi_{1-y}M_yO_{2+z} \quad \text{[Chemical Formula 1]}$$

(in Chemical Formula 1, x and y are in a range of 0.9≤x≤1.2, and 0≤y≤0.7, and z is in a range of −0.1≤z≤0.1, M is at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr).

8. The cathode active material for a lithium secondary battery according to claim 7, wherein in Chemical Formula 1, 0≤y≤0.2.

9. The cathode active material for a lithium secondary battery according to claim 7, wherein in Chemical Formula 1, M includes Co and Mn.

10. The cathode active material for a lithium secondary battery according to claim 7, wherein the lithium-transition metal composite oxide particle is manufactured by reacting a transition metal precursor with a lithium precursor.

11. The cathode active material for a lithium secondary battery according to claim 10, wherein the transition metal precursor is a Ni—Co—Mn precursor.

12. The cathode active material for a lithium secondary battery according to claim 10, wherein the lithium precursor includes lithium carbonate, lithium nitrate, lithium acetate, lithium oxide or lithium hydroxide.

13. A lithium secondary battery comprising:
a cathode which comprises a cathode active material layer comprising the cathode active material according to claim 1; and
an anode facing the cathode.

\* \* \* \* \*